July 18, 1961
J. C. KINLEY
2,992,875
RECORDING CHART
Filed April 8, 1958
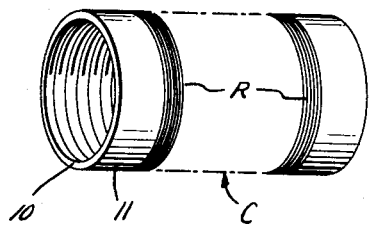
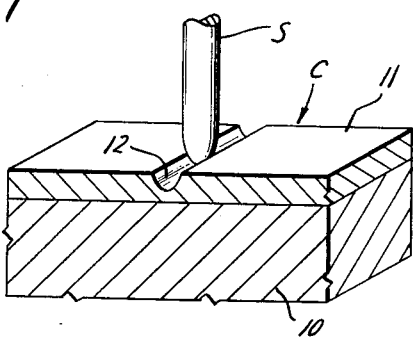
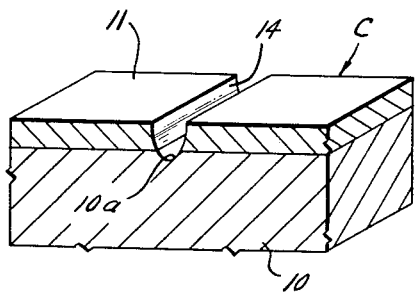
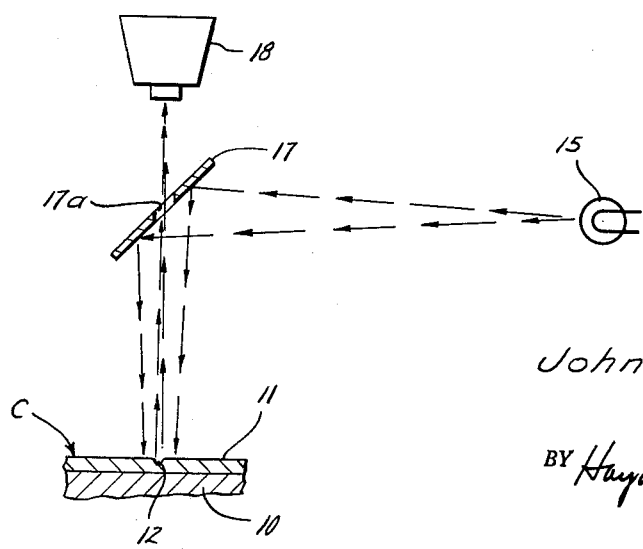
John C. Kinley
INVENTOR.
BY Hayden + Pravel
ATTORNEYS

United States Patent Office 2,992,875
Patented July 18, 1961

2,992,875
RECORDING CHART
John C. Kinley, 1040 N. 6th St., Bellaire, Tex.
Filed Apr. 8, 1958, Ser. No. 727,147
3 Claims. (Cl. 346—1)

This invention relates to a new and improved recording chart and method of using same.

In the calipering of tubing or pipe in wells with calipering tools, one type of which is disclosed in co-pending United States patent application Serial No. 653,649, filed April 18, 1957, a record of the surface variations in the tubing or pipe is made on a recording chart. Such record is composed of a plurality of lines on the recording chart. In order to keep the size of the chart within reasonable limits, it is desirable to record the lines on the chart as close together as possible while still obtaining a record which can be read or transferred therefrom for reading. The problem becomes accentuated when a plurality of styluses are simultaneously used for recording the record lines on a cylindrical chart as disclosed in said application, Serial No. 653,649.

It is therefore an object of this invention to provide a new and improved recording chart and method of using same wherein record lines or indicia are recorded on the chart in close proximity to each other while still being sufficiently clear and distinct to be readable or transferable for reading.

An important object of this invention is to provide a new and improved recording chart and method of using same, wherein the chart has a dark surface with a dull finish which reflects little or no light therefrom, and wherein such dark surface is capable of being rendered shiny or light-reflective at selected areas by a stylus or similar recording member, whereby the light-reflective areas on such chart represent a record which can be photographically transferred to a film or other light-sensitive material.

A particular object of this invention is to provide a new and improved recording chart and method of using same, wherein the chart is cylindrical and has a dark dull finish on its external cylindrical surface which reflects little or no light therefrom, and wherein such dark dull finish is capable of being rendered shiny or light-reflective at selected areas by a stylus or similar recording member, whereby the light-reflective areas on such finish represent a record which can be photographically transferred to a film or other light-sensitive material.

A further object of this invention is to provide a new and improved recording chart and method of using same, wherein the chart is formed with a surface of anodized aluminum which has been colored black or with another dark color which is substantially non-reflective of light, and wherein such surface is capable of being polished, impressed or scratched to form light-reflective areas which can be photographically reproduced.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein:

FIG. 1 is a perspective view of a typical chart incorporating the invention;

FIG. 2 of the drawings is a sectional view of one form of the chart construction of this invention with a portion of a stylus or other recording member engaging the surface of such chart construction;

FIG. 3 is a view similar to FIG. 2, but showing the scratching of the coating on the chart construction of this invention as compared to the impressing of the coating as illustrated in FIG. 2; and FIG. 4 is a schematic illustration to show the photographic reproduction which can be made in carrying out the method of this invention with the recording chart of this invention.

In the drawings, the letter C designates generally the chart of this invention in cylindrical form. Such chart C as illustrated in FIG. 1 of the drawings is typical of the type of chart used in connection with the calipering tool illustrated in said patent application Serial No. 653,649. Record lines R are formed on a surface of the chart C in accordance with relative movement between the chart C and one or more styluses or recording members S (a portion of which is shown in FIG. 2). The particular type of stylus S or other recording member which is used may be varied in conjunction with the chart C may be varied in carrying out the method of this invention with the chart of this invention, but the stylus S or styluses S and the chart C are preferably of the type used in conjunction with calipering tools such as illustrated in said patent application Serial No. 653,649. The invention is particularly suitable in connection with a record produced by a plurality of styluses operating simultaneously on the chart C to produce the record lines R relatively close to each other. With this invention, even though the record lines or other indicia R are located relatively close to each other so as to be almost indistinguishable from each other with the naked eye, they can be clearly and distinctly reproduced photographically. Also, if desired, the record lines R may be magnified to increase their readability and with substantially no loss of sharpness or distinction because of such magnification when using the chart and the method of this invention.

The chart of this invention would normally be a cylindrical shape as illustrated in FIG. 1 of the drawings, but the invention is not limited to a chart having such shape. The chart C, portions of which are illustrated in section in FIGS. 2 and 3, includes a body 10 which has a coating or surface 11 therewith which is adapted to be engaged or contacted by one or more of the styluses S or other similar recording members. The coating or surface 11 may be a separate coating which has been applied to the body 10 or it may be a prepared surface formed or created on the body 10. In the preferred form of the invention, the coating or surface 11 is black and is dull so that it does not reflect any appreciable light therefrom. The surface or coating 11 may be a color other than black so long as it reflects little or no light therefrom. Such surface or coating 11 is therefore substantially non-reflective of light prior to the time that it is engaged by the stylus or styluses.

The surface or coating 11 also has the characteristic of becoming light-reflective in the areas contacted by the stylus or styluses S as they are moved relatively to the chart C. Such relative movement between the stylus or styluses S and the chart C causes a polishing, impressing, or a scratching of the coating 11 to form light-reflective lines or other areas which are representative of the movements of the stylus S or styluses S relative to the chart C. In FIG. 2 of the drawings, the stylus S is shown as having impressed the surface or coating 11. A polishing action would give a similar appearance, although it would not necessarily indent or deform the surface of the coating 11 as illustrated in FIG. 2. It will be understood that the illustrations in FIGS. 2 and 3 are enlarged to emphasize the invention.

It will be noted that the impressed groove or line 12 does not go all of the way through the surface or coating 11 to the body 10, whereas in FIG. 3, the groove or line 14 does cut all of the way through to the body 10.

Therefore, in the form of the invention shown in FIG. 2, the light reflection from the groove or line 12 results from either the polishing or the impression only of the surface or coating 11, whereas in connection with the groove or line 14 of FIG. 3, the light reflection is also caused by the contrast between the surface or coating 11 and the exposed metal or other material 10a at the bottom of the groove 14. For example, if the body 10 is aluminum, and the coating 11 is black or other dark color, it will be evident that a sharp contrast is obtained between the colors of the aluminum at the exposed portion 10a in the groove 14 and the dark surface of the coating 11. It will also be evident that FIGS. 2 and 3 illustrate only one groove 12 and one groove 14, respectively, but in actual practice there will be a plurality of such grooves as indicated in FIG. 1 wherein the record lines R are shown close together. Such record lines would of course normally extend for substantially the full length of the chart C and they would be substantially adjacent to each other. The lines 12 and 14 as shown in FIGS. 2 and 3 are therefore merely exemplary of the record lines R which would be formed on the chart C.

The invention herein is not limited to any particular materials or thicknesses of materials, and so long as the surface or coating 11 on the body 10 is substantially non-reflective of light except in the areas which are contacted by the stylus or styluses S and which is capable of reflecting light from such areas that are contacted by the stylus S or styluses S, the invention herein will be carried out. However, in the preferred form of the invention, the body 10 of the chart C is aluminum and the surface or coating 11 is anodized aluminum which has a coloring material therewith to render it substantially non-reflective of light. The procedure for obtaining anodized aluminum surfaces and for coloring same with a dye and the like is well known. Basically, the anodization procedure involves the initial cleaning of the aluminum to de-grease the surface thereof. Trichloroethylene may be used for such cleaning procedure. An alkaline cleaning step with sodium hydroxide at about 150° F. is generally employed following the de-greasing step and then the aluminum is rinsed. The aluminum is next anodized by making the aluminum the anode in an electrolytic cell, the electrolyte of which is a solution of sulphuric acid of 10% to 25% by weight concentration. The actual anodization period is about one and a half hours at a temperature of 70 to 75° F. and with about 12 to 15 volts across the electrolytic bath. Although the conditions for the anodization may vary, it is considered important to have the aluminum in the electrolytic bath for a longer period of time than normally employed in anodization because it is believed such extended anodization results in the desired ultimate dull surface finish on the aluminum after it is dyed.

The anodized aluminum is rinsed after being removed from the electrolytic bath and then it is subjected to a dye bath for about fifteen to thirty minutes at 140 to 180° F. The time of the immersion of the aluminum in the dye bath and the temperature of the bath are varied in accordance with the particular dye involved. Although the invention herein is not considered to be limited to any particular dye or coloring material, it has been found that a mixture composed of 80 parts of Acid Black 52 which is a mono azo dye having a nitro-aminonaphthol sulfonic acid coupling and 20 parts of Mordant Green 33 which is a mono azo dye having a nitro-chlor-aminophenol coupling is satisfactory. Such dye mixture produces a black dull matte finish which reflects little or no light therefrom. Another suitable dye is Acid Black 52 by itself. The designations "Acid Black 52" and "Mordant Green 33" are the common designations listed in the "Color Index," 2nd edition, 1956, published jointly by the Society of Dyers and Colorists and the American Association of Textile Chemists and Colorists. Also, "National Nigrosine 12525" sold by National Aniline Division of the Allied Chemical & Dye Corporation is a suitable dye for the purposes of this invention. The "National Nigrosine 12525" has a composition which is not fully known, but it is believed to contain a mixture of triphenazineoxazines and phenazineazines plus a small percentage, about 5%, of the sodium salt of m-sulphobenzene-azodiphenylamine. Also, a satisfactory surface or coating 11 may be produced by immersing the oxide coated aluminum in a solution of cobalt acetate and thereafter immersing the anodized aluminum in a solution of ammonium sulphide. Substantially the same type of finish may be obtained on the surface or coating 11 by initially immersing the anodized metal in nickel acetate and thereafter immersing such anodized metal in ammonium sulphide. It is therefore believed evident that the invention herein is not limited to any particular dye or coloring material so long as it is capable of producing a surface or coating 11 which is substantially non-light-reflective but which is capable of being rendered light-reflective in areas contacted by a stylus or recording member.

After the coloring matter has been added to the anodized aluminum surface in the example given above, the aluminum chart is dried very rapidly without blowing air thereon by holding the chart over an open flame. Such drying procedure prevents the formation of streaks on the chart surface and it produces a surface which has a uniform dull velvet-like finish. The surface of the aluminum is then ready for use in carrying out the method of this invention.

In carrying out the method of this invention with the product thereof, the chart C with its coating or surface 11 is engaged by one or more styluses S to form the record lines R thereon. Such lines R are formed as relative movement occurs between the chart C and the stylus or styluses S. In a well caliper of the type described in the aforesaid patent application, the chart C is rotated and is also moved longitudinally relative to each of the styluses S. Also, the styluses S move in response to surface variations in the well pipe or other pipe which are encountered and such additional relative movement of the styluses with respect to the chart C is also reflected in the configuration of the record information lines or indicia R. The stylus or styluses S polish, impress or scratch the coating or surface 11 to form light-reflective lines or areas on the otherwise non-light-reflective surface or coating 11. Therefore, there is a distinct contrast between the lines or record indicia R and the rest of the surface or coating 11. Such contrast enhances the readability and it particularly enhances the photographic reproduction of such record lines R.

In FIG. 4 of the drawings, a schematic illustration is given to illustrate the photographic reproduction of the record lines or other indicia R, as exemplified by the line 12. Thus, as illustrated in FIG. 4, a light source 15 directs light to a reflecting surface or mirror 17 which is mounted at an angle above the portion of the chart C to be reproduced. A light stop or slit (not shown) may be positioned between the light 15 and the mirror 17 if desired. The light is directed as indicated by the arrows in FIG. 4 downwardly from the reflecting surface or mirrors 17 to the surface or coating 11 in the vicinity of the light-reflecting line or area 12 to be reproduced. There may of course be a plurality of lines within the lighted area on the chart C which are to be reproduced simultaneously. The light is reflected from the light reflecting line or area 12 only and such reflected light is directed upwardly through the opening 17a in the mirror 17 to a camera 18 having a light sensitive film or material therein. By moving the chart C relative to the light source and coordinating such movement with the movement of the film or light sensitive material in the camera 18, the entire record on the chart C may be transferred to the film or light sensitive material. Due to the fact that the coating 11 is substantially non-light-reflective except in the areas of the record line R, a distinct and clear photographic reproduction is obtained on the film or light sensitive material in the camera 18. Also, if desired, the camera 18 may include means for magnifying the record produced on the photographic film so that the record lines R are enlarged as they appear on the film.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A recording chart comprising an aluminum chart body, an anodized aluminum surface coating thereon, said anodized aluminum surface coating having coloring matter therewith which provides a dark dull finish that is substantially non-light-reflective, and a plurality of polished areas thereon, said polished areas representing recorded information and being completely contained within said surface coating to provide light reflective areas in said substantially non-light-reflective surface coating.

2. A recording chart comprising an aluminum chart body, an anodized aluminum surface coating thereon, said anodized aluminum surface coating having coloring matter therewith which provides a finish that is substantially non-light-reflective, and a plurality of polished areas thereon, said polished areas representing recorded information and being completely contained within said surface coating to provide light reflective areas in said substantially non-light-reflective surface coating.

3. A method of forming a chart with a recording member wherein a chart body is provided with a continuous surface coating which is substantially non-reflective of light comprising the steps of, engaging the recording member with the surface coating, moving the coating surface and recording member relatively to form polished areas in said surface coating, representing recorded information completely contained within said coating and which areas are light reflective relative to the non-reflective surface coating.

References Cited in the file of this patent

UNITED STATES PATENTS

| | | |
|---|---|---|
| 748,918 | Bristol | Jan. 5, 1904 |
| 2,000,527 | Linderman | May 7, 1935 |
| 2,141,964 | Yonkers | Dec. 27, 1938 |
| 2,563,119 | Kelly | Aug. 7, 1951 |
| 2,662,828 | Dubusc | Dec. 15, 1953 |
| 2,691,627 | Johnson | Oct. 12, 1954 |

FOREIGN PATENTS

| | | |
|---|---|---|
| 756,552 | Great Britain | Sept. 5, 1956 |